(12) United States Patent
Cordell

(10) Patent No.: US 10,463,032 B2
(45) Date of Patent: Nov. 5, 2019

(54) HYBRID FISH THUMPER-SCALE DEVICES

(71) Applicant: Dale M. Cordell, Springfield, OR (US)

(72) Inventor: Dale M. Cordell, Springfield, OR (US)

( * ) Notice: Subject to any disclaimer, the term of this patent is extended or adjusted under 35 U.S.C. 154(b) by 120 days.

(21) Appl. No.: 15/424,327

(22) Filed: Feb. 3, 2017

(65) Prior Publication Data

US 2018/0084770 A1  Mar. 29, 2018

Related U.S. Application Data

(60) Provisional application No. 62/401,316, filed on Sep. 29, 2016.

(51) Int. Cl.
| *A01K 97/00* | (2006.01) |
| *A01K 99/00* | (2006.01) |
| *G01G 19/14* | (2006.01) |
| *G01G 19/60* | (2006.01) |
| *G01G 21/22* | (2006.01) |

(52) U.S. Cl.
CPC .............. *A01K 97/00* (2013.01); *A01K 99/00* (2013.01); *G01G 19/14* (2013.01); *G01G 19/60* (2013.01); *G01G 21/22* (2013.01); *A01K 2227/40* (2013.01)

(58) Field of Classification Search
CPC ................................ A01K 97/00; A01K 99/00
USPC .............................................................. 43/4
See application file for complete search history.

(56) References Cited

U.S. PATENT DOCUMENTS

| 2,570,688 | A | * | 10/1951 | Keegan | ................... | A01K 97/14 294/26 |
| 2,586,245 | A | * | 2/1952 | McRae | ..................... | G01G 3/02 177/131 |
| 2,757,002 | A | * | 7/1956 | Ryden | ..................... | A01K 97/00 285/302 |
| 3,082,561 | A | * | 3/1963 | Convey | .................. | A01K 77/00 177/149 |
| 3,848,689 | A | * | 11/1974 | Hilterhaus | ............... | G01G 3/02 177/148 |
| 4,351,126 | A | * | 9/1982 | Simonson | ............... | A01K 97/14 294/26 |
| 4,885,862 | A | * | 12/1989 | Thayer | .................... | A01K 97/14 43/6 |
| 5,228,226 | A | * | 7/1993 | Porosky | .................. | A01K 97/14 294/26 |
| 5,356,139 | A | * | 10/1994 | Parsons | .................. | F41B 15/025 463/47.7 |
| 6,094,996 | A | * | 8/2000 | Campbell | .............. | G01G 19/60 177/245 |
| 6,526,691 | B1 | * | 3/2003 | Maddox | ................. | A01K 97/14 43/53.5 |
| 6,989,495 | B2 | * | 1/2006 | Yang | ....................... | A01K 97/14 177/131 |
| 7,076,910 | B1 | * | 7/2006 | Xifra | ...................... | A01K 97/00 177/148 |

(Continued)

*Primary Examiner* — David J Parsley
(74) *Attorney, Agent, or Firm* — Dascenzo Intellectual Property Law, P.C.

(57) ABSTRACT

Hybrid fish thumper-scale devices. A hybrid fish thumper-scale device includes a barrel configured to stun a fish by striking the fish with the barrel, a handle rigidly coupled to the barrel and configured to be gripped by a user, and a weighing scale configured to provide an indication of the weight of the fish. The weighing scale includes a fixed portion rigidly coupled to the handle and a mobile portion elastically coupled to the handle.

21 Claims, 6 Drawing Sheets

(56) References Cited

U.S. PATENT DOCUMENTS 7,503,139 B1 * 3/2009 Fitzgerald .............. A01K 97/14
   294/26

* cited by examiner

US 10,463,032 B2

HYBRID FISH THUMPER-SCALE DEVICES

RELATED APPLICATION

The present application claims priority under 35 U.S.C. § 119(e) to U.S. Provisional Patent Application No. 62/401,316, which is entitled "HYBRID FISH THUMPER-SCALE DEVICES," which was filed on Sep. 29, 2016, and the disclosure of which is hereby incorporated by reference.

FIELD

The present disclosure relates to hybrid fish thumper-scale devices.

BACKGROUND

When catching fish to eat, proper handling of the fish is important, such as for safety and taste reasons. As fish are relatively delicate creatures, extended fighting and thrashing during capture can bruise the meat and stress the fish, thereby building up chemicals (e.g., lactic acid) that can make the meat taste sour and/or otherwise unpleasant. Moreover, after fish are caught, some people keep the fish on a stringer, in a mesh bucket, or in a livewell, typically until the fish dies or until someone is ready to prepare the fish. Such handling also can stress fish, leading to less palatable meat. Further, delaying the cleaning of a fish until long after its death may degrade the meat.

For the most palatable meat, fish should be stunned or killed soon after being caught. Doing so also removes the possibility of thrashing and biting, which could lead to lost fish, hook jabs, bruised flesh, etc. One technique for stunning or killing fish is to use a fish thumper (sometimes called a fish bat or a fish whacker), which is a baton, or similar device, used to hit the fish on the head to stun or kill the fish.

To further protect flavor and enhance storage life, fish may be bled soon after stunning or killing, typically by breaking or cutting the gill arch. Bleeding helps to eliminate from the flesh waste products that cause off-flavors (e.g., lactic acid), oxygen that leads to spoilage, and bacteria that lead to spoilage and/or contamination.

When landing a fish, it may be desirable or necessary to note the size and/or weight of the fish. The live weight of the fish is a useful measure of the size and may be obtained with a fish scale. For ease of handling, the fish weight may be measured after stunning the fish. To measure the live weight, the fish needs to be measured before bleeding, or any subsequent cleaning steps.

Aside from a fish scale and a fish thumper, landing a fish may involve use of several other tools, such as a fishing pole, fishing line, a net, a gaff, a knife, a hook puller, and/or a ruler. However, considering that many fishing sites are remote, requiring travel and/or hiking across significant distances, storing and carrying all these individual tools may be inconvenient, especially in the limited space of a boat or a portable toolbox. Hence, multi-purpose tools may be useful to those who fish.

SUMMARY

Hybrid fish thumper-scale devices are disclosed herein. A hybrid fish thumper-scale device includes a barrel configured to stun a fish by striking the fish with the barrel, a handle rigidly coupled to the barrel and configured to be gripped by a user, and a weighing scale configured to provide an indication of the weight of the fish. The weighing scale includes a fixed portion rigidly coupled to the handle and a mobile portion elastically coupled to the handle.

DESCRIPTION

Figure 1:
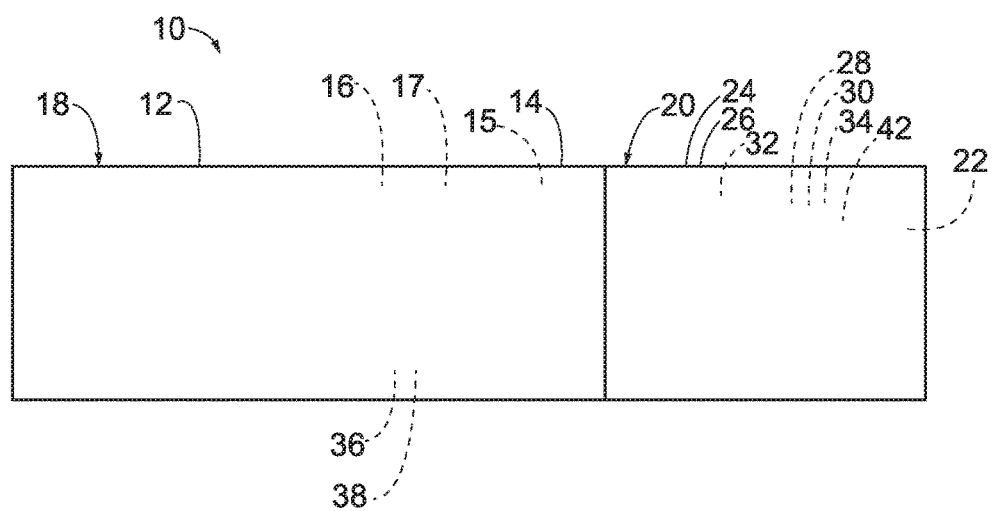
FIG. 1 is a schematic representation of hybrid fish thumper-scale devices according to the present disclosure.

FIGS. 1-12 illustrate various embodiments and aspects of hybrid fish thumper-scale devices 10 according to the present disclosure. In general, in the drawings, elements that are likely to be included in a given embodiment are illustrated in solid lines, while elements that are optional or alternatives are illustrated in dashed lines. However, elements that are illustrated in solid lines are not essential to all embodiments of the present disclosure, and an element shown in solid lines may be omitted from a particular embodiment without departing from the scope of the present disclosure. Elements that serve a similar, or at least substantially similar, purpose are labeled with numbers consistent among the figures. Like numbers in each of the figures, and the corresponding elements, may not be discussed in detail herein with reference to each of the figures. Similarly, all elements may not be labeled in each of the figures, but reference numerals associated therewith may be used for consistency. Elements, components, and/or features that are discussed with reference to one or more of the figures may be included in and/or used with any of the figures without departing from the scope of the present disclosure.

As schematically illustrated in FIG. 1, a hybrid fish thumper-scale device 10 according to the present disclosure comprises a barrel 12 that is configured to stun a fish, a handle 14 that is rigidly coupled to the barrel, and a weighing scale 20 that is configured to weigh a fish. As used herein, the term "rigidly coupled" may refer to and/or describe two or more components that are coupled directly or indirectly to one another such that the components do not move and/or rotate with respect to one another. This does not require in all examples that the components cannot be intentionally separated or adjusted, but it does mean that the components, in their operative and/or assembled configurations, are not configured for movement relative to each other during use of the device. The weighing scale includes a fixed portion 24 that is rigidly coupled to handle 14 and a mobile portion 26 that is elastically coupled to the handle. As used herein, the term "elastically coupled" may refer to and/or describe two or more components that are coupled directly or indirectly to one another such that the components are configured to move and/or rotate with respect to one another, during use of the device to weigh a fish. Elastically coupled components may be, but are not required to be, biased toward a particular relative configuration. Hence, mobile portion 26 may be described as being coupled to handle 14 such that the mobile portion may translate with respect to the handle (such as along a mutual longitudinal axis), and such that the mobile portion is biased toward a nominal position with respect to the handle. As a more specific example, and as schematically illustrated in FIG. 1, mobile portion 26 may be said to be biased toward the nominal position by a spring 30 that is coupled to each of the mobile portion and handle 14. Handle 14 is rigidly coupled to barrel 12, forming a rigid combined structure that collectively may be referred to as a body 18 of hybrid fish thumper-scale device 10. Hence, fixed portion 24 of weighing scale 20 may be described as being rigidly coupled to handle 14, barrel 12, and body 18.

Generally, hybrid fish thumper-scale devices 10 are configured for use in fishing applications, and thus may be hand-held, compact, non-marring, easy to identify (e.g., brightly colored, etc.), buoyant, and/or resistant to environmental damage (e.g., from water, sun, salt, marine life, and/or viscera). Hence, the size, weight, and/or materials of hybrid fish thumper-scale devices 10 may be selected to be suitable for fishing, such as for being carried by a fisherman, conveniently stowed and/or transported on a boat or in a tackle box, etc. Generally, hybrid fish thumper-scale devices 10 may be configured to be readily cleaned (e.g., by rinsing with water) and/or may be non-porous. Examples of suitable materials for constructing at least a portion of hybrid fish thumper-scales 10 include metal (such as aluminum, stainless steel, and magnesium), durable resins, plastics, rubber, wood, stone, and/or combinations thereof.

As schematically illustrated in FIG. 1, and as less schematically illustrated in FIGS. 2-12, hybrid fish thumper-scale devices 10 generally may be elongated, with an overall shape that is generally columnar. Hybrid fish thumper-scale device 10 and/or its components may be cylindrically symmetric, or cylindrically asymmetric. Furthermore, hybrid fish thumper-scale device 10 and/or components thereof may possess rotational symmetry and/or reflection symmetry.

Barrel 12 of hybrid fish thumper-scale device 10 is configured to stun a fish, generally by blunt force trauma when an operator strikes the fish's head with the barrel, and therefore may be generally rigid and/or massive. As used here, the term "massive," as used to describe a component and/or portion of hybrid fish thumper-scale device 10, may be used to describe a component and/or portion that has a greater mass and/or a greater density than a remainder of the hybrid fish thumper-scale device. Hence, a component described as being "massive" may be configured to impart a force, such as a blunt force and/or a blunt trauma force, when swung against a fish or other object.

Though barrel 12 generally is configured to stun a fish, depending on the force applied, a hit with the barrel also may kill a fish (such as by blunt force trauma). Barrel 12 may be rigid enough to transfer a force from handle 14, applied by the operator, to the barrel. Additionally or alternatively, barrel 12 may be massive enough to efficiently stun, or even kill, a fish without requiring excessive force to be exerted by the operator and/or without requiring repeated strikes to the fish with the barrel. Generally, barrel 12 may be weighted, such as to render the barrel more massive than a remainder of hybrid fish thumper-scale device 10 and/or to balance the weight of the hybrid fish thumper-scale device between handle 14 and the end of the barrel distal to the handle.

Barrel 12 is generally elongated, with the narrow dimension similar in size to a fish head, i.e., narrow enough to accurately apply blunt force to the head of a fish and wide enough to avoid lacerating or slicing the head. For example, for fish like bass, trout, and salmon, the barrel may have a width of about 0.5-6" (1-15 cm), about 1-3" (2.5-7.5 cm), about 2-4" (5-10 cm), about 1" (2.5 cm), about 2" (5 cm), about 3" (7.5 cm), and/or about 4" (10 cm). The length of the barrel may be about 4-18" (10-45 cm), about 6-12" (15-30 cm), about 9-15" (22.5-37.5 cm), about 4" (10 cm), about 6" (15 cm), about 8" (20 cm), about 10" (25 cm), and/or about 12" (30 cm).

As schematically illustrated in FIG. 1, and as less schematically illustrated in FIGS. 2-11, hybrid fish thumper-scale devices 10 may comprise a shaft 16 in the form of a component of body 18 that is rigidly coupled to each of barrel 12 and handle 14. When present, shaft 16 may be located generally between barrel 12 and handle 14. Generally, shaft 16 is elongated and extends at least a majority portion (i.e., greater than 50%), if not a substantial portion (i.e., greater than 75%), or even all, of the total length of the hybrid fish thumper-scale device. Additionally or alternatively, shaft 16 may be an extension of barrel 12 and/or handle 14, may be a component of the barrel and/or the handle, and/or may extend within the barrel and/or the handle.

Handle 14 may be configured for secure grip of hybrid fish thumper-scale device 10 both during use as a fish thumper (to stun a fish) and during use as a fish scale (to weigh a fish). For fish thumping, the handle generally is configured such that an operator may swing barrel 12 hard enough to stun, and optionally kill, a fish. For fish weighing, the handle generally is configured such that an operator may hold the hybrid fish thumper-scale device with a fish supported by weighing scale 20. The handle may be configured to fit in at least one hand of a user (e.g., a one-hand grip or a two-hand grip) and/or may include a grip surface 17 configured to be gripped by the user. As examples, grip surface 17 may include and/or be contouring, texturing, and/or padding, such as to improve a grip property of the handle and/or to provide a more comfortable grip.

Handle 14 may be elongated. For example, in an embodiment in which barrel 12 is elongated (i.e., has an elongated direction), handle 14 may be aligned with the barrel elongate direction. Handle 14 may have any appropriate dimensions. As examples, the length of the handle may be about 4-12" (10-30 cm), about 4" (10 cm), about 6" (15 cm), about 8" (20 cm), and/or about 10" (25 cm).

As schematically illustrated in FIG. 1, and as less schematically illustrated in FIGS. 2-12, handle 14 may include one or more transverse members 15 that protrude from, and/or include a portion that is transverse to, a remainder of the handle. As examples, transverse member 15 may include and/or be a bar, a rod, a disc, a lanyard, a pommel, a knob, and/or a protrusion. The transverse member may be located generally anywhere along the handle, including proximate to either end of the handle. As examples, the transverse member may be located proximate to the end of handle 14 that is proximate to barrel 12 and/or the end of the handle that is distal to the barrel.

Transverse member 15 may be configured as a secondary handle of hybrid fish thumper-scale device 10. For example, transverse member 15 may be configured to support the hybrid fish thumper-scale device with a fish supported by weighing scale 20. More specifically, the transverse member may be configured to be gripped in addition to and/or instead of handle 14 when the fish is supported by weighing scale 20. Additionally or alternatively, the transverse member may aid grip and/or control of the handle and/or provide a guard between the operator's hand and barrel 12 of hybrid fish thumper-scale device 10. For example, the transverse member may include and/or be a raised ring that projects from the end of handle 14 proximate to barrel 12. As another example, the transverse member may include and/or be a pommel that extends from the end of the handle proximate to the barrel. As yet another example, the transverse member may be configured to engage a sturdy external object such as a ledge, a rail, or a table, such as to steady hybrid fish thumper-scale device 10 while a fish is being weighed. In such an embodiment, the transverse member may include a component that extends at least substantially perpendicular to the handle, such that the sturdy external object may simultaneously abut each of the transverse member and the handle. Additionally or alternatively, the transverse member may be configured to selectively fold into and/or out of a transverse relationship with the handle and/or may be configured to fold into an orientation that is generally aligned with the handle.

As discussed, barrel 12, handle 14, and (when present) shaft 16 collectively may form rigid body 18. Generally, the body is configured to form a fish thumper (e.g., to stun a fish). The barrel, the handle, and the optional shaft may be formed of one or more materials that are continuous across one or more of the interfaces between the components. For example, the barrel and the handle may be machined, molded, cast, and/or otherwise formed from a single monolithic piece (e.g., a metal rod, a wood rod, a molded plastic or composite rod, etc.). Stated differently, two or more of the barrel, the handle, and (when present) the shaft may be formed of unitary construction.

As discussed, hybrid fish thumper-scale device 10 comprises weighing scale 20 configured to weigh a fish. The weighing scale also may be referred to as a fish scale, a scale, and/or a balance. The weighing scale may be configured to weigh fish of any appropriate species and/or mass, examples of which include bass, trout, and salmon, optionally weighing about 1-100 lbs. (0.5-45 kg), about 2-50 lbs. (1-25 kg), about 5-75 lbs. (2.5-37.5 kg), about 10-60 lbs. (5-30 kg), less than about 5 lbs. (2 kg), less than about 10 lbs. (4.5 kg), less than about 20 lbs. (9 kg), less than about 50 lbs. (25 kg), and/or less than about 80 lbs. (35 kg).

Figure 3:
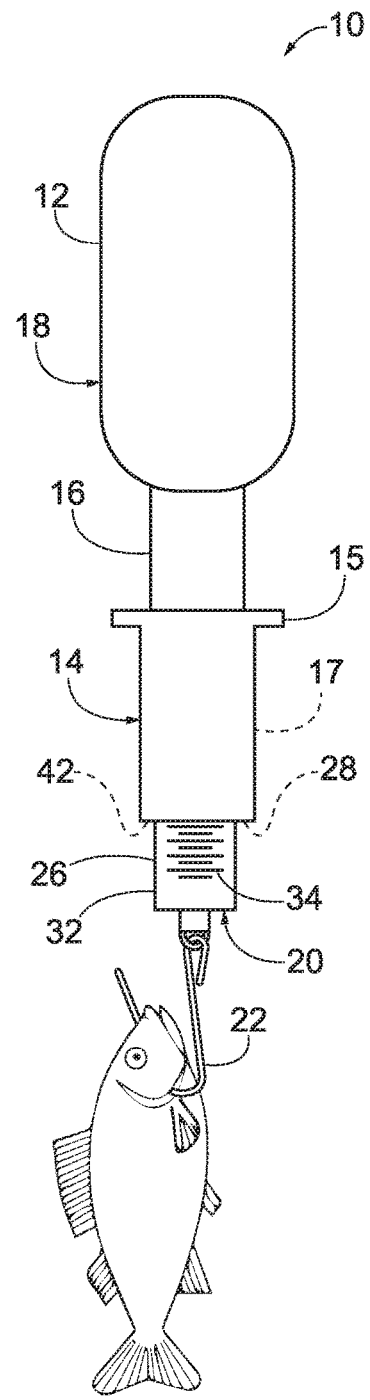
FIG. 3 is an elevation view of the hybrid fish thumper-scale devices of FIG. 2 supporting a fish.
Figure 4:
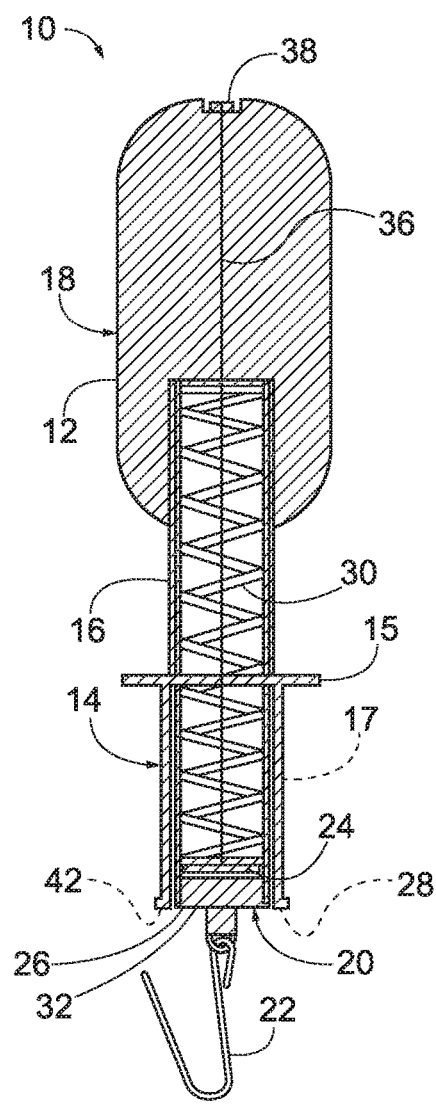
FIG. 4 is a cross-sectional elevation view of examples of hybrid fish thumper-scale devices according to the present disclosure.
Figure 5:
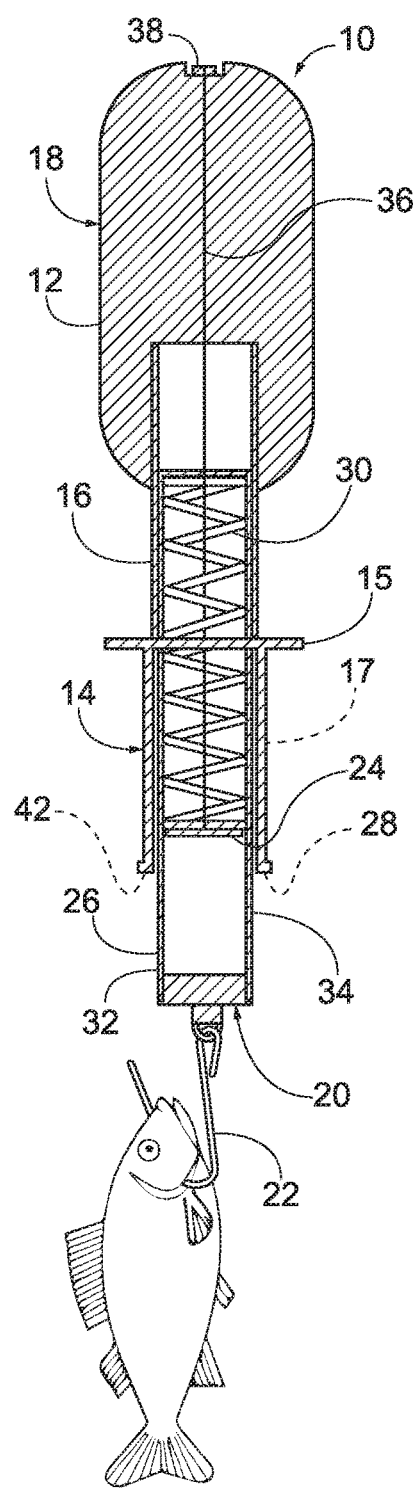
FIG. 5 is a cross-sectional elevation view of the hybrid fish thumper-scale devices of FIG. 4 supporting a fish.
Figures 6, 7, 8:
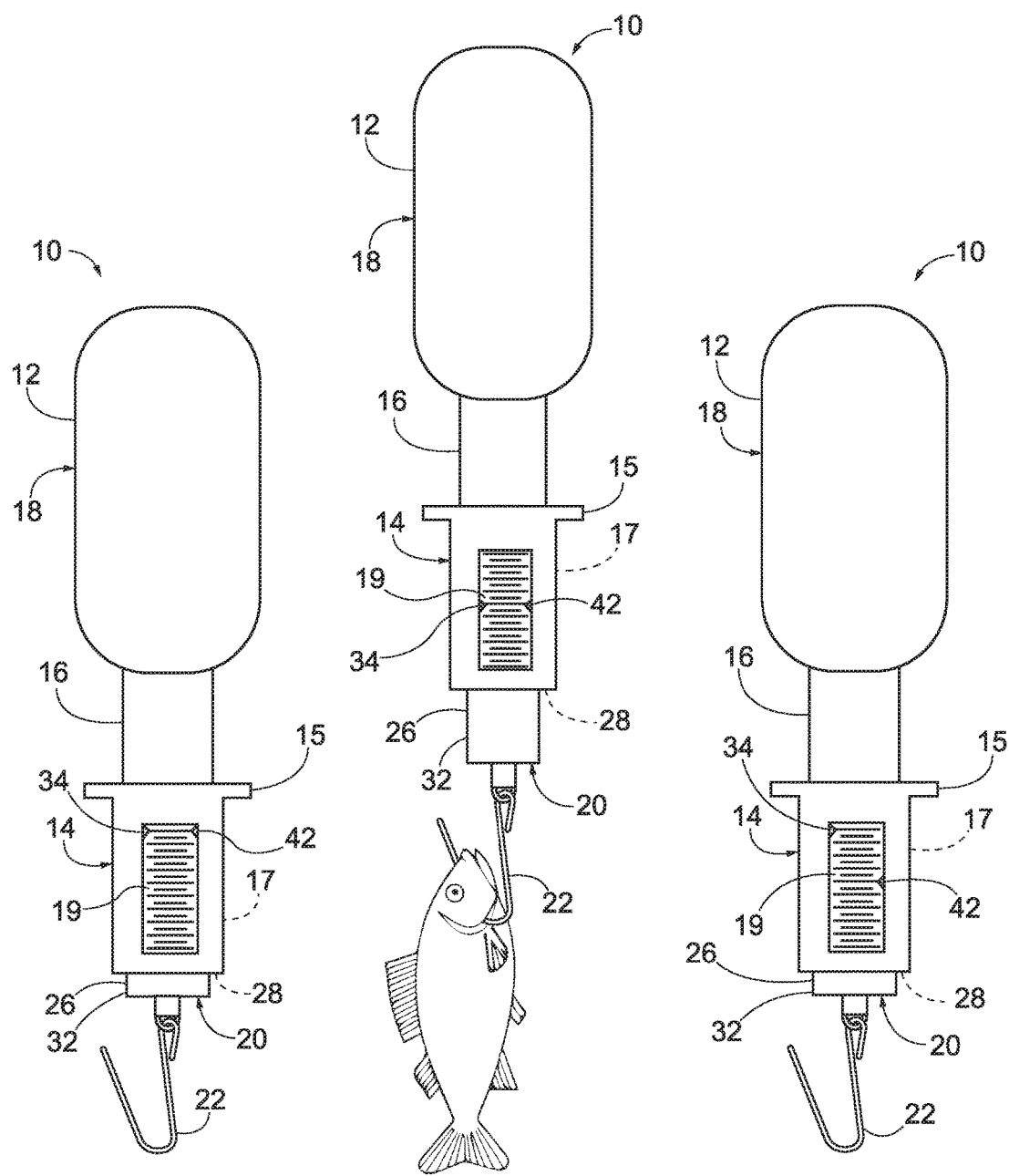
FIG. 6 is an elevation view of examples of hybrid fish thumper-scale devices according to the present disclosure with a viewing window.
FIG. 7 is an elevation view of the hybrid fish thumper-scale devices of FIG. 6 supporting a fish.
FIG. 8 is an elevation view of the hybrid fish thumper-scale devices of FIG. 6 after removing the supported fish.
Figure 10:
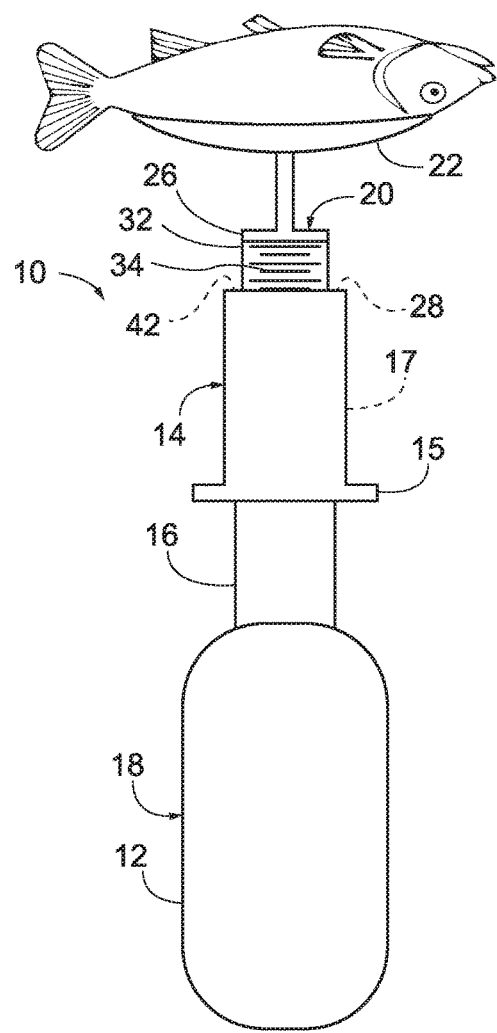
FIG. 10 is an elevation view of the hybrid fish thumper-scale devices of FIG. 9 supporting a fish.

As discussed, and as illustrated in cutaway in FIGS. 4-5, weighing scales 20 include fixed portion 24 and mobile portion 26 that is elastically coupled to the fixed portion by spring 30. When weight is applied to the mobile portion while the fixed portion is held stationary, the spring elastically deforms and produces a force to at least substantially balance the applied weight, i.e., the spring may be configured to exert a force to counteract the weight of a fish supported by the weighing scale. The weighing scale may be configured to support the applied weight of a fish from above, such as by hanging the fish from the weighing scale (as illustrated in FIGS. 3, 5, and 7), and/or from below, such as by carrying the fish above the weighing scale (as illustrated in FIG. 10). The weighing scale may be configured to put the spring into compression and/or tension (extension) when supporting the applied weight. For example, the spring may be compressed or extended when a fish is supported by the weighing scale. As a more specific example, FIGS. 4-5 illustrate an embodiment of hybrid fish thumper-scale device 10 that is configured to support a fish from above, and that is configured such that spring 30 is compressed (between an upper end of mobile portion 26 and a lower end of fixed portion 24) when the hybrid fish thumper-scale device supports a fish.

Generally, the applied weight (e.g., the weight of a fish) may be related to the elastic deformation (displacement) of spring 30 produced by the applied weight. For example, for sufficiently small deformations, the displacement of a spring is proportional to the applied force (a property known as Hooke's law). Hence, a measurement of the displacement of spring 30 may serve to determine the magnitude of the applied weight that produced the displacement. Any suitable type, size, and/or number of springs 30 may be utilized. As an example, spring 30 may include and/or be a helical spring, a spiral spring, a torsional spring, a wire spring, a gas spring, and/or a hydraulic spring. Additionally or alternatively, the spring may include an elastomer and/or a strain gauge. The spring may be configured to balance a weight of about 1-100 lbs. (0.5-45 kg), about 2-50 lbs. (1-25 kg), about 5-75 lbs. (2.5-37.5 kg), about 10-60 lbs. (5-30 kg), less than about 5 lbs. (2 kg), less than about 10 lbs. (4.5 kg), less than about 20 lbs. (9 kg), less than about 50 lbs. (25 kg), and/or less than about 80 lbs. (35 kg). The spring may be configured for a maximum displacement (compression or extension) of about 1" (2.5 cm), about 2" (5 cm), about 3" (7.5 cm), about 4" (10 cm), about 6" (15 cm), or about 8" (20 cm).

Fixed portion 24 of weighing scale 20 is rigidly coupled to handle 14 such that the handle may be configured to support the hybrid fish thumper-scale device 10 when a fish is supported by the weighing scale. As schematically illustrated in FIG. 1, hybrid fish thumper-scale device 10 may include an optional scale retention mechanism 36 that serves to rigidly secure and/or couple fixed portion 24 to handle 14 and/or to body 18. Stated differently, each of fixed portion 24 and body 18 may be directly rigidly coupled to scale retention mechanism 36, such that the fixed portion and the body are indirectly rigidly coupled to one another. Additionally or alternatively, scale retention mechanism 36 may be configured to permit relative rotation between the fixed portion and the body 18 while restricting translation of the fixed portion relative to the body. The scale retention mechanism also may be configured to directly couple to any appropriate component of the body, such as barrel 12, handle 14, and/or shaft 16. Additionally or alternatively, the scale retention mechanism may couple a portion of spring 30 (such as the portion coupled to fixed portion 24) to the handle. As examples, the scale retention mechanism may include and/or be a plate, a rod, a clamp, a hook, a pin, and/or a bolt.

As schematically illustrated in FIG. 1, and as less schematically illustrated in FIGS. 4-5, scale retention mechanism 36 may include a fastener 38 configured to at least partially retain the scale retention mechanism in place with respect to a component of body 18. Stated differently, the scale retention mechanism may be coupled and/or rigidly coupled to the body at least partially by the fastener. As illustrated in FIGS. 4-5, the fastener may be positioned on an exterior surface of body 18, such as to permit a user to actuate the fastener to selectively decouple weighing scale 20 and/or a component thereof from body 18. Examples of fasteners include a nut, a bolt, a pin, adhesive, and a weld.

As discussed, mobile portion 26 of weighing scale 20 is elastically coupled to fixed portion 24 and hence is elastically coupled to each of handle 14 and body 18. The mobile portion may be configured to extend from an end of handle 14 and/or of body 18, such as when weight is applied to weighing scale 20 and/or when no weight is applied to the weighing scale. As schematically illustrated in FIG. 1, and as less schematically illustrated in FIGS. 2-12, mobile portion 26 may include a telescoping member 32 configured to repeatedly extend from and retract into handle 14 and/or body 18. Stated differently, the telescoping member may be configured to move with the mobile portion relative to fixed portion 24 and to handle 14. The telescoping member may include and/or be a rod or a tube coupled to spring 30, and/or may be a portion of the spring.

Figure 9:
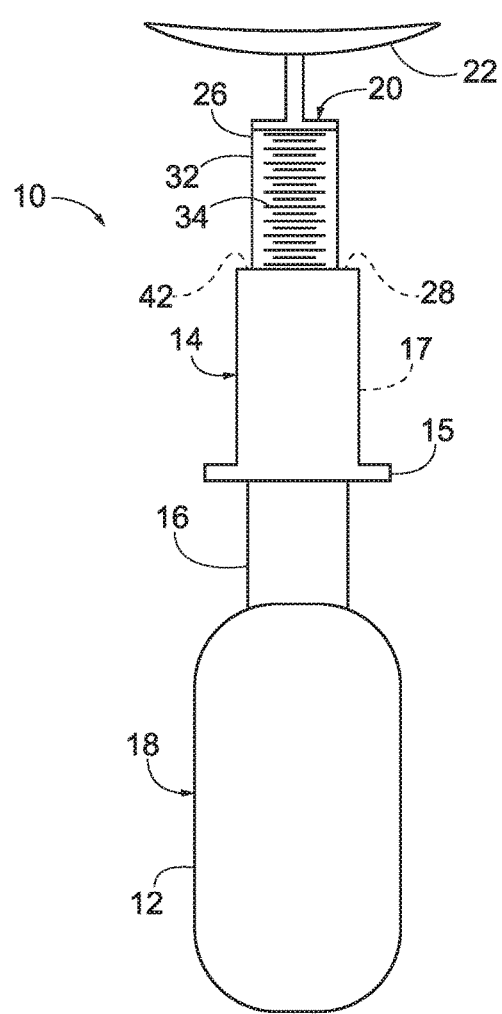
FIG. 9 is an elevation view of examples of hybrid fish thumper-scale devices according to the present disclosure configured to support a fish from below.

Mobile portion 26 may be coupled to a fish retainer 22. The fish retainer may be any appropriate device configured to selectively couple to and/or otherwise support a fish during weighing. Examples of a fish retainer include a hook, a weigh hook, a gill hook, a gaff, a clip, a lip clip, a clamp, a sling, a pan, and a tray. As examples, FIGS. 2-7 and 11-12 illustrate hybrid fish thumper-scale device 10 with the fish retainer 22 in the form of a hook, while FIGS. 9-10 illustrate the hybrid fish thumper-scale device with the fish retainer 22 in the form of a tray. The fish retainer may be configured for temporary or permanent attachment to the mobile portion. For example, the fish retainer may be coupled to the mobile portion with a chain, an eye, an eyelet, a hook, a nut, a bolt, a pin, adhesive, a weld, a snap, and/or a buckle.

As schematically illustrated in FIG. 1, and as less schematically illustrated in FIGS. 2-12, hybrid fish thumper-scale device 10 may include a weight indicator 34 configured to visually indicate the weight of a fish. The weight indicator may include a pointing device, a directing device, a scale, gradation marks, a dial, an electronic display, and/or a digital display. In general, and as discussed, a position and/or displacement of spring 30 may serve as an indicator of the weight applied to the spring. Hence, hybrid fish thumper-scale device 10, weighing scale 20, telescoping member 32, and/or spring 30 may be configured to allow direct visual observation of the weight of a fish via a visual observation of the displacement of the spring due to the applied weight, as quantified by the weight indicator.

Weight indicator 34 may be coupled to, a feature of, and/or visible through barrel 12, handle 14, body 18, weighing scale 20, telescoping member 32, and/or spring 30. For example, and as illustrated in FIGS. 2-3 and 9-12, the weight indicator may include and/or be gradation marks printed on the telescoping member configured to be exposed in proportion to the weight of a fish when the fish is supported by the weighing scale. As another example, and as illustrated in FIGS. 6-8, the body and/or the handle may include a viewing window 19 configured to permit visual inspection of at least a portion of the weighing scale. As an example, and as illustrated in FIGS. 6-8, the weighing scale may include a series of gradation marks imprinted on the viewing window, and mobile portion 26 may include a weight indicator 34 in the form of an arrow such that comparing a position of the weight indicator (as viewed through the viewing window) with the series of gradation marks may provide an indication of the weight of the fish. Additionally or alternatively, the weight indicator may include a series of gradation marks imprinted on the mobile portion and visible through the viewing window, and the body, the handle, and/or the viewing window may include a pointer and/or other indicator that may be compared to the series of gradation marks to visually indicate the displacement of the spring and/or the weight of the fish when the fish is supported by the weighing scale.

As schematically illustrated in FIG. 1, and as perhaps best illustrated in FIGS. 6-8, weight indicator 34 may include a peak hold indicator 42 configured to indicate a previously indicated weight after that weight is removed from weighing scale 20. For example, and as illustrated in FIGS. 6-8, the peak hold indicator may take the form of an arrow and/or other marking visible through viewing window 19 that may indicate a maximum weight (e.g., of a fish) supported by the weighing scale until selectively reset to a zero position. The peak hold indicator may be an at least partially mobile element that may be temporarily displaced by the spring motion due to an attached weight. The peak hold indicator may be a memory device (e.g., in an electronic display) configured to retain the last weight reading. The peak hold indicator may be selectively locked in place by the user and/or selectively reset by the user. Additionally or alternatively, the peak hold indicator may temporarily lock weighing scale 20, such as to temporarily restrict movement of fixed portion 24 with respect to mobile portion 26, to temporarily restrict a change in the displacement of spring 30, and/or to temporarily restrict a change in the weight indicated by weight indicator 34.

As schematically illustrated in FIGS. 1-10, hybrid fish thumper-scale device 10 further may include a scale lock 28 that is configured to temporarily secure mobile portion 26 of weighing scale 20 to handle 14. Stated differently, the scale lock may be configured to temporarily and/or selectively rigidly couple the mobile portion to the handle, such as to restrict translation and/or longitudinal translation of the mobile portion with respect to the handle. Securing the mobile portion of the weighing scale may be useful for storage and/or to avoid interference with fish thumper operation. For example, the scale lock may be configured to secure the mobile portion for storage, to protect the weighing scale from forces applied during fish thumper use (e.g., while stunning a fish), and/or to restrict components of hybrid fish thumper-scale device 10 from coming loose during fish thumper use (e.g., while stunning a fish). Stated differently, the scale lock may be configured to restrict the mobile portion 26 and/or telescoping member 32 thereof from translating with respect to body 18 and/or the handle when the hybrid fish thumper-scale device is not being utilized and/or is being utilized for a function that does not include weighing a fish. Additionally or alternatively, the scale lock may be configured to temporarily restrain fish retainer 22 with respect to and/or against the mobile portion and/or the handle. For example, in an embodiment in which the fish retainer includes and/or is a hook, it may be desirable to restrain the hook against the mobile portion and/or the handle to restrict the hook from inadvertently snagging a foreign object when weighing scale 20 is not in use. Examples of scale locks may include a clip, a nut, a pin, a strap, a hook, a twist-lock, a fastener, a hook-and-loop fastener, a snap, and/or a buckle.

Figure 2:
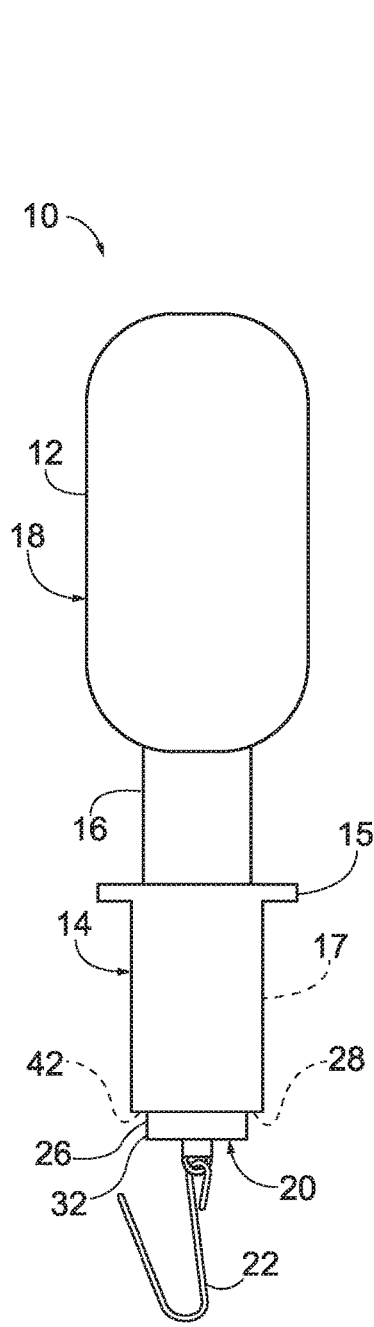
FIG. 2 is an elevation view of examples of hybrid fish thumper-scale devices according to the present disclosure.

As discussed, FIG. 2 illustrates embodiments of hybrid fish thumper-scale device 10 that include handle 14 with transverse member 15, and FIG. 3 illustrates the embodiments of FIG. 2 supporting a fish. As discussed, transverse member 15 may be configured to aid grip on the handle when the hybrid fish thumper-scale device is used to stun a fish and/or when the device is used to weigh a fish. In the embodiments of FIGS. 2-3, weighing scale 20 is generally contained within handle 14 and may be configured to extend from the handle (i.e., mobile portion 26 is moveably positioned at the end of the handle). The weighing scale includes fish retainer 22 in the form of a weigh hook and includes weight indicator 34 (shown in FIG. 3) in the form of a series of gradation marks imprinted on telescoping member 32 of the mobile portion. As further illustrated in FIGS. 2-3, the hybrid fish thumper-scale devices may include a scale lock 28 generally coupled to the end of the handle.

FIG. 4 illustrates a cross-sectional view of certain embodiments of hybrid fish thumper-scale devices 10, and FIG. 5 illustrates the embodiments of FIG. 4 supporting a fish. The internal details reveal the mechanism of weighing scale 20, including fixed portion 24, mobile portion 26, spring 30, and telescoping member 32. In this arrangement, the spring is encompassed by the telescoping member and is configured to compress when a weight is attached (e.g., when a fish is supported by the weighing scale). The fixed portion is rigidly coupled to handle 14 via scale retention mechanism 36, which includes a plate coupled to the spring, a rigid rod, and fastener 38 that couples the rigid rod to barrel 12. The barrel and shaft 16 are rigidly coupled to the handle. The barrel defines a passageway through its center to accept the rigid rod. The shaft is generally hollow to accept telescoping member 32. The rigid rod may include a threaded portion near the fastener and the fastener may include a threaded receiver (e.g., a nut) that may be used to set the tension on the spring when no weight is attached and/or to adjust the operation of the weighing scale, such as to calibrate the weighing scale.

FIG. 4 illustrates embodiments of hybrid fish thumper-scale devices 10 that include an extensible weighing scale 20, and FIG. 5 illustrates the embodiments of FIG. 4 supporting a fish. Mobile portion 26 of the weighing scale extends beyond the end of the handle 14 when sufficient weight is attached. The mobile portion includes a telescoping member 32 that substantially covers spring 30 (not visible in the figure) when the mobile portion extends beyond the end of the handle. The telescoping member includes a weight indicator 34 in the form of gradation marks that are configured to be exposed when a weight is attached. Weight indicator 34 may include peak hold indicator 42. As illustrated, the peak hold indicator may be configured to temporarily lock the mobile portion in an extended position corresponding to the attached weight after the attached weight is removed from the weighing scale.

Figure 11:
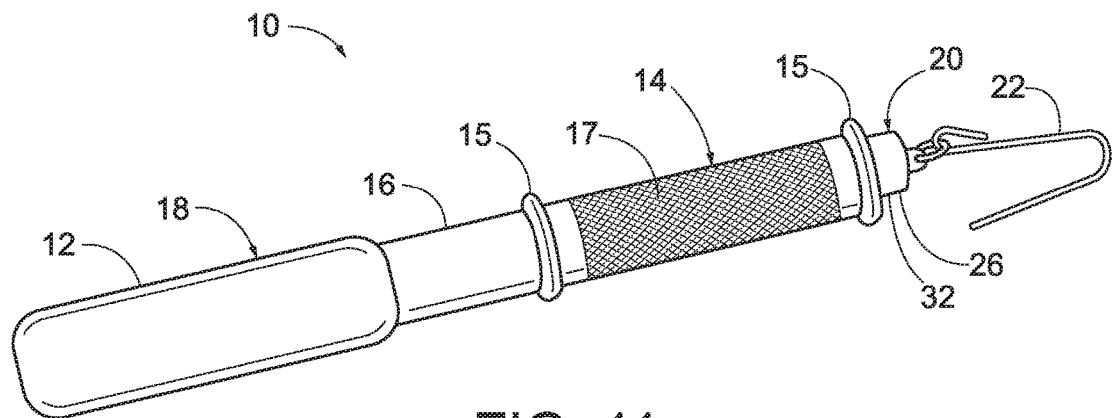
FIG. 11 is a perspective view of an example of a hybrid fish thumper-scale device according to the present disclosure.

FIG. 11 illustrates an embodiment of hybrid fish thumper-scale device 10 that includes monolithic body 18. That is, in the embodiment of FIG. 11, the body is a single unitary part that includes barrel 12, handle 14, and shaft 16. For example, the body may be turned and/or otherwise formed from a solid rod of metal, wood, plastic, etc. Handle 14 includes two transverse members 15 in the form of a raised ring located at the end of the handle proximate shaft 16 and a raised ring located at the end of the handle proximate weighing scale 20. In addition, handle 14 includes a knurled central region configured to aid grip of the hybrid fish thumper-scale device. Further, weighing scale 20 includes mobile portion 26 that includes telescoping member 32. Weighing scale 20 is coupled to fish retainer 22 (a weighing hook in FIG. 11).

Figure 12:
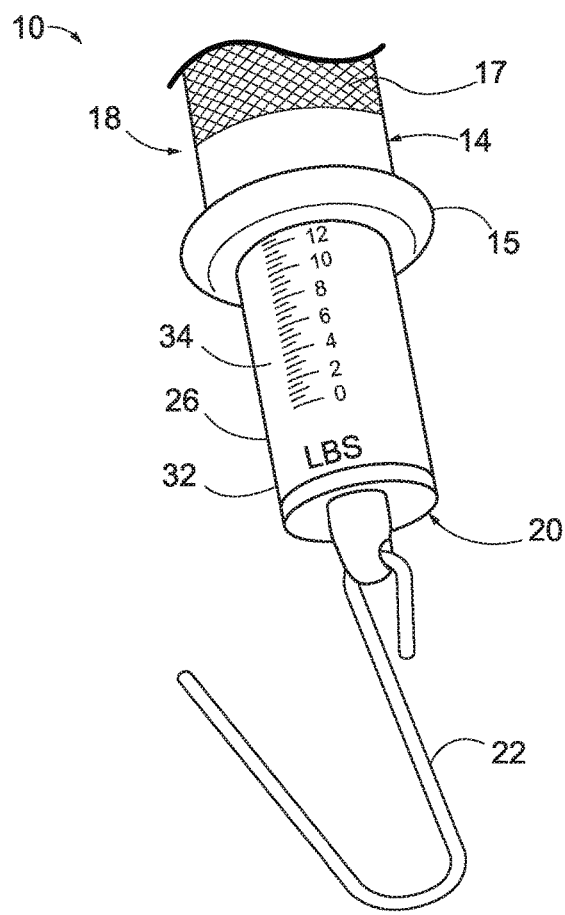
FIG. 12 is a fragmentary perspective view of a scale portion of the hybrid fish thumper-scale device of FIG. 11.

FIG. 12 illustrates details of an example of weighing scale 20 projecting from body 18. The weighing scale of FIG. 12 includes mobile portion 26 that includes a telescoping member 32. As illustrated, telescoping member 32 is extended from the end of handle 14 due to an approximately 12 pound load attached to fish retainer 22. Telescoping member 32 includes two weight indicators 34 (one scaled for weight in pounds and one scaled for weight in kilograms). The weight of a fish hung from fish retainer 22 is indicated by the visible indicator mark (of weight indicator 34) that is closest to the end of the handle 14.

Examples of hybrid fish thumper-scale devices according to the present disclosure are described in the following enumerated paragraphs:

A1. A hybrid fish thumper-scale device, comprising:
a barrel configured to stun a fish by striking the fish with the barrel;
a handle rigidly coupled to the barrel and configured to be gripped by a user; and
a weighing scale configured to provide an indication of the weight of the fish;
wherein the weighing scale includes a fixed portion rigidly coupled to the handle and a mobile portion elastically coupled to the handle.

A2. The device of paragraph A1, wherein the weighing scale includes a spring configured to exert a force to counteract a weight of a fish supported by the weighing scale.

A2.1. The device of paragraph A2, wherein the spring is configured to compress under the weight of a fish supported by the weighing scale.

A2.2. The device of any of paragraphs A2-A2.1, wherein the spring is configured to extend under the weight of a fish supported by the weighing scale.

A2.3. The device of any of paragraphs A2-A2.2, further comprising a spring retainer configured to rigidly couple the fixed portion of the weighing scale to the handle.

A3. The device of any of paragraphs A1-A2.3, wherein the weighing scale includes a telescoping member.

A3.1. The device of paragraph A3, wherein the telescoping member includes a telescoping member weight indicator, optionally wherein the telescoping member weight indicator includes a peak hold indicator configured to indicate a previously indicated weight after the weight is removed.

A4. The device of any of paragraphs A1-A3.1, wherein the handle includes a handle weight indicator, optionally wherein the handle weight indicator includes a/the peak hold indicator configured to indicate a previously indicated weight after the weight is removed.

A5. The device of any of paragraphs A1-A4, further comprising a fish retainer coupled to the mobile portion of the weighing scale, optionally wherein the fish retainer is one or more of a hook, a weigh hook, a gill hook, a gaff, a clip, a lip clip, a clamp, a sling, a pan, and a tray.

A5.1. The device of paragraph A5, wherein the fish retainer is configured to be temporarily and/or removably coupled to the mobile portion.

A6. The device of any of paragraphs A1-A5.1, further comprising a scale lock configured to temporarily secure the mobile portion of the weighing scale to the handle.

A6.1. The device of paragraph A6, further comprising a/the fish retainer coupled to the mobile portion of the weighing scale, and wherein the scale lock is configured to temporarily secure the fish retainer to at least one of the mobile portion of the weighing scale and the handle.

A7. The device of any of paragraphs A1-A6.1, wherein the handle includes at least one transverse member.

A7.1. The device of paragraph A7, wherein the transverse member is configured as a grip portion.

A7.2. The device of any of paragraphs A7-A7.1, wherein the transverse member is configured to support the hybrid fish thumper-scale device against a sturdy external object when a fish is supported by the weighing scale.

A7.3. The device of any of paragraphs A7-A7.2, wherein the transverse member is configured to fold into an orientation that is generally aligned with and/or proximate the handle.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

INDUSTRIAL APPLICABILITY

The systems and methods disclosed herein are applicable to the fishing and aquaculture industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A hybrid fish thumper-scale device, comprising:
a barrel configured to stun a fish by striking the fish with the barrel;
a handle rigidly coupled to the barrel and configured to be gripped by a user; and
a weighing scale configured to support the fish and to provide an indication of the weight of the fish;
wherein the weighing scale includes a fixed portion rigidly coupled to the handle and a mobile portion elastically coupled to the handle; wherein the device further comprises a fish retainer that extends from the mobile portion of the weighing scale and is configured to selectively couple to the fish when the fish is supported by the weighing scale; and wherein the fish retainer is pivotal relative to the fixed portion of the weighing scale during use of the weighing scale to weigh a fish;
wherein the device has a weight and the barrel has a weight;
wherein the device has a length and the barrel has a length; and
wherein the weight of the device is balanced along the length of the barrel.

2. The device of claim 1, wherein the weighing scale is configured to support the fish from above, with the fish suspended beneath the device by the fish retainer.

3. The device of claim 1, wherein the weighing scale includes a spring configured to exert a force to counteract a compressive force applied by the weight of the fish supported by the weighing scale.

4. The device of claim 1, wherein the weighing scale includes a peak hold indicator configured to automatically indicate a previously indicated weight after the weight is removed.

5. The device of claim 1, wherein the mobile portion includes a telescoping member configured to repeatedly extend from and retract into the handle, and wherein the telescoping member includes a telescoping member weight indicator configured to visually indicate the weight of the fish when the fish is supported by the weighing scale.

6. The device of claim 5, wherein the telescoping member weight indicator includes a series of telescoping member gradation marks imprinted on the telescoping member, wherein the series of telescoping member gradation marks is configured to be exposed in proportion to the weight of the fish when the fish is supported by the weighing scale.

7. The device of claim 1, wherein the handle includes a viewing window configured to permit visual inspection of at least a portion of the weighing scale.

8. The device of claim 7, wherein the handle further includes a handle weight indicator that includes a series of gradation marks imprinted on the viewing window, and wherein the mobile portion includes a weight indicator configured to be visible through the viewing window to provide an indication of the weight of the fish.

9. The device of claim 1, wherein the mobile portion is attached to the fixed portion by a fastener, and wherein the fastener is configured to permit the mobile portion to be selectively coupled to and uncoupled from the handle without damaging the device.

10. The device of claim 1, wherein the fish retainer includes at least one of a hook, a weigh hook, a gill hook, a clip, a lip clip, a clamp, and a sling.

11. The device of claim 1, wherein the fish retainer is configured to be selectively and repeatedly coupled to and decoupled from the mobile portion without damage to the device.

12. The device of claim 1, wherein the device further comprises a scale lock configured to selectively and temporarily secure the mobile portion of the weighing scale relative to the handle.

13. The device of claim 12, wherein the scale lock is configured to temporarily secure the fish retainer relative to at least one of the mobile portion of the weighing scale and the handle.

14. The device of claim 1, wherein the handle includes at least one transverse member that protrudes from a remainder of the handle in a direction at least substantially perpendicular to a length of the handle.

15. The device of claim 14, wherein the transverse member is configured to be gripped by a user.

16. The device of claim 1, wherein the fish retainer is coupled for pivotal movement relative to the fixed portion of the weighing scale by one or more of a chain, an eye, an eyelet, a hook, a nut, a bolt, a pin, and a buckle.

17. The device of claim 1, wherein the device has a density distributed along the length of the barrel, wherein the handle has a length; wherein the device has a density distributed along said length; and wherein the density distributed along the length of the barrel is greater than the density distributed along the length of the handle.

18. A hybrid fish thumper-scale device, comprising:
a barrel configured to stun a fish by striking the fish with the barrel;
a handle rigidly coupled to the barrel and configured to be gripped by a user; and
a weighing scale configured to support the fish and to provide an indication of the weight of the fish;
wherein the weighing scale includes a fixed portion rigidly coupled to the handle and a mobile portion elastically coupled to the handle; wherein the device further comprises a fish retainer that extends from the mobile portion of the weighing scale and is configured to selectively couple to the fish when the fish is supported by the weighing scale; and wherein the fish retainer is pivotal relative to the fixed portion of the weighing scale during use of the weighing scale to weigh a fish;
wherein the barrel has a length and the device has a density distributed along said length;
wherein the handle has a length and the device has a density distributed along said length; and
wherein the density distributed along the length of the barrel is greater than the density distributed along the length of the handle.

19. The device of claim 18, wherein the weighing scale includes a spring configured to exert a force to counteract a compressive force applied by the weight of the fish supported by the weighing scale.

20. The device of claim 18, wherein the weighing scale includes a peak hold indicator configured to automatically indicate a previously indicated weight after the weight is removed.

21. The device of claim 18, wherein the mobile portion includes a telescoping member configured to repeatedly extend from and retract into the handle, and wherein the telescoping member includes a telescoping member weight indicator configured to visually indicate the weight of the fish when the fish is supported by the weighing scale.

* * * * *